(12) United States Patent
Balmakhtar et al.

(10) Patent No.: US 11,963,080 B1
(45) Date of Patent: Apr. 16, 2024

(54) DYNAMIC INTELLIGENT ALERT EDGE COMPUTING SYSTEM AND METHOD

(71) Applicant: T-Mobile Innovations LLC, Overland Park, KS (US)

(72) Inventors: Marouane Balmakhtar, Fairfax, VA (US); Gregory Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 2 days.

(21) Appl. No.: 17/171,231

(22) Filed: Feb. 9, 2021

(51) Int. Cl.
*H04W 4/90* (2018.01)
*H04W 4/021* (2018.01)
*H04W 4/06* (2009.01)

(52) U.S. Cl.
CPC ............. *H04W 4/90* (2018.02); *H04W 4/021* (2013.01); *H04W 4/06* (2013.01)

(58) Field of Classification Search
CPC ......... H04W 4/90; H04W 4/021; H04W 4/06; H04W 76/50; G08B 25/016; H04M 11/04; H04M 2242/04
USPC ....................................................... 455/404
See application file for complete search history.

(56) References Cited

U.S. PATENT DOCUMENTS

| | | | |
|---|---|---|---|
| 10,674,319 B1* | 6/2020 | Chandra Mondal | G01S 5/0231 |
| 10,798,635 B2 | 10/2020 | Seenappa et al. | |
| 11,026,279 B1* | 6/2021 | Yang | H04W 4/06 |
| 2006/0025106 A1 | 2/2006 | Byers et al. | |
| 2007/0280211 A1* | 12/2007 | Malueg | H04L 63/30 |
| | | | 370/356 |
| 2014/0155018 A1* | 6/2014 | Fan | H04W 72/51 |
| | | | 455/404.1 |
| 2014/0282934 A1* | 9/2014 | Miasnik | H04W 4/02 |
| | | | 726/5 |
| 2018/0238701 A1* | 8/2018 | Liebinger | G01C 21/3626 |
| 2018/0322785 A1* | 11/2018 | Jerichow | G08G 1/162 |
| 2019/0140939 A1* | 5/2019 | Schooler | H04L 47/2416 |
| 2019/0333387 A1* | 10/2019 | Lau | H04W 4/38 |
| 2020/0127749 A1 | 4/2020 | Rao et al. | |
| 2020/0137535 A1* | 4/2020 | Hoffner | H04W 4/90 |
| 2021/0160679 A1* | 5/2021 | Henkle | H04W 76/50 |
| 2021/0212168 A1* | 7/2021 | Yoden | H04L 67/289 |
| 2022/0201456 A1* | 6/2022 | Chiang | H04W 76/50 |
| 2022/0256306 A1* | 8/2022 | Perraud | H04W 4/021 |

FOREIGN PATENT DOCUMENTS

WO 2020173552 A1 9/2020

* cited by examiner

*Primary Examiner* — Charles N Appiah
*Assistant Examiner* — Frank E Donado
(74) *Attorney, Agent, or Firm* — Jones Robb, PLLC (57) ABSTRACT

Systems and methods are provided for dynamically generating intelligent alerts at a network edge based on coverage area characteristics. A central alert orchestrator within the network determines target edge locations and forwards alerts to regional alert systems at the target edge locations. The regional alert systems modify either content of the alert or the alert metadata or both based on characteristics of the alerts and the coverage area.

17 Claims, 8 Drawing Sheets

DYNAMIC INTELLIGENT ALERT EDGE COMPUTING SYSTEM AND METHOD

TECHNICAL BACKGROUND

Alert dissemination systems exist today to warn the public about various types of events. Types of alerts include, for example, tornado alerts, evacuation alerts, earthquake alerts, child abduction alerts, water contamination alerts, power outage alerts, volcano alerts, hurricane alerts, wildfire alerts, flash flooding alerts, road condition alerts, blizzard alerts, and any type of alerts deemed to impact public safety. The alerts originate with authorities at local, state, and federal levels. These alerting authorities forward the alerts to the Integrated Public Alert and Warning System (IPAWS), which further distributes the alerts to various dissemination systems that direct the alerts to their destinations. For example, the destinations may be devices connected over a network and may be provided to individuals through radio, television, cable, satellite, wireless devices, web applications, web sites, social media, digital signage, sirens, etc.

Currently available alert dissemination systems are centralized and do not have granularity to manipulate alerts to fit specific geographical locations or a set of a subscriber population or possible other conditions or requirements. In addition, the distribution systems are also dispersed (e.g., Emergency Alert System, Wireless Emergency Alerts (WEA), Internet Services, National Oceanographic and Atmospheric Administration (NOAA), and state and local alerting systems) and work independently from each other. Alerts originating at IPAWs and delivered to these systems designed to be distributed from a central location over a corresponding network to particular geographical locations.

This centralized approach introduces several limitations. For instance, message content and distribution parameters are generally fixed and cannot be modified or altered. Thus, systems are limited to transmission of a specific message over a dispersed coverage area. The messages cannot be tailored or adapted to reflect the impact of the event on the coverage area. Currently, when an alert is received by a network, the network selects cell sites to determine the destination and the same content is forwarded to all of the receiving cell sites.

Evolving capabilities of wireless networks enable a more distributed design. A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs.

Deployment of the evolving RATs in a network provides numerous benefits. For example, newer RATs may provide additional resources to subscribers, faster communications speeds, and other advantages. For example, 5G networks provide edge deployments enabling computing capabilities closer to UEs. However, increased interference and latencies may be created due to higher power capabilities of 5G devices. With an increasing number of devices connected over 5G RATS, an introduced latency may be higher than expected when disseminating alerts using existing distribution methods. Consequently, the volume of the alert messages can also increase usage in the existing dissemination capacities which may result in lost alert messages loss and other possible shortcomings, all or which can have detrimental implications in the evolving 5G and Internet of Things (IoT) systems. Accordingly, improvements are provided herein that overcome such deficiencies by leveraging the architecture and capabilities of evolving technologies to create intelligent alerts tailored to target recipient areas.

Overview

Exemplary embodiments described herein include systems, methods, and processing nodes for dynamically managing alerts. Exemplary embodiments of the method include receiving an alert at a network edge computing system serving wireless devices within a distribution area, the alert received by a centralized alert orchestrator and including content and metadata. Embodiments of the method further include processing, at the edge computing system, the received alert in order to modify the content of the received alert for the distribution area. The processing includes evaluating the alert based on characteristics of the distribution area and modifying the content of the received alert to create a modified alert. The method further includes distributing the modified alert to at least some of the wireless devices within the distribution area.

An additional exemplary embodiment includes an edge computing system having a central alert orchestrator and multiple regional computing systems serving wireless devices within a distribution area. Each regional computing system includes at least one processor configured to receive alerts from the central alert orchestrator. The alerts include content and metadata and the alert processor of the regional computing system processes the received alerts in order to modify the content of the received alerts for the distribution area. The processing includes evaluating the alert based on characteristics of the distribution area and modifying the content of the received alerts to create modified alerts. The edge computing system further transmits the modified alerts to at least some of the wireless devices within the distribution area.

An additional exemplary embodiment includes an edge computing system having at least one processor programmed to receive alerts including content and metadata and process the received alerts in order to modify the content of the received alerts for a distribution area. The processing includes evaluating the alert based on characteristics of the distribution area and modifying the content of the received alerts to generate modified alerts. The processor further manages distribution of the modified alerts to at least some wireless devices within the distribution area.

In additional embodiments set forth herein, the regional computing system modifies metadata attached to the received alerts. The modification of metadata may result in a change in repetition rate or frequency of distribution of the alert to a particular distribution area.

DETAILED DESCRIPTION

Exemplary embodiments described herein include systems, methods, and processing nodes for dynamically leveraging the power of edge computing to customize and distribute alerts from an access node using the power of edge computing. Edge computing involves a distributed computing paradigm that brings computation and data storage closer to where the information is needed, such as at end user wireless devices. Computing resources are implemented at the edges of a network in close proximity to devices and information sources. Edge computing provides benefits including increased bandwidth and reduced latency. Therefore, embodiments disclosed herein aim to leverage edge computing to improve the speed and intelligence of alerts.

Embodiments disclosed herein leverage multi-access edge computing (MEC), which involves a network architecture concept that enables cloud computing capabilities and an IT service environment at the edge of the cellular network and, more generally at the edge of any network. By performing processing tasks closer to the cellular customer, network congestion is reduced and processing occurs more quickly. MEC technology is designed to be implemented at the cellular base stations or other edge nodes, and enables flexible and rapid deployment of new applications and services for customers. The system and method disclosed herein leverage edge computing and evolving network capabilities to disseminate faster and more intelligent alerts by leveraging evolving network capabilities. In networks such as 5G networks, edge locations become more critical and the network is more decentralized. The decentralized architecture provides an opportunity to change how alert systems are constructed, routed, and disseminated to their final destinations.

In the embodiments disclosed herein, a dynamic intelligent alert edge computing system provides further granularity to existing distribution alert systems by harnessing the edge capabilities in a network having a multi-access edge computing (MEC) system. The MEC system may include, for example, multiple MEC servers providing edge computing capabilities at base stations or access nodes. The disclosed system ensures that the intended alert messages are processed and received at the intended coverage areas, for the intended subscriber population and devices, as quickly as possible and puts additional controls in place to make the alerts relevant to subscribers. Accordingly, the intelligent alert edge computing system determines the content of the alert, which may vary based on recipient location. The intelligent alert edge computing system also determines the timing of the alert, which may vary based on both severity and location. The intelligent alert edge computing system may further determine which device types receive the alert and what geographical locations and coverage areas receive the alert.

A method as disclosed herein includes receiving an alert at a network edge computing system serving wireless devices within a distribution area. The alert, which includes content and metadata, is received by a centralized alert orchestrator. The central alert orchestrator transfers the alert to regional alert systems at selected edge locations. At the selected edge locations, the edge computing system processes the received alert in in order to modify the content of the received alert for the distribution area. The processing includes evaluating the alert based on characteristics of the distribution area, modifying the content of the received alert to create a modified alert, and distributing the modified alert to at least some of the wireless devices within the distribution area.

The processing includes accessing stored information including geographical information to determine the characteristics of the distribution area, and comparing the geographical information related to the distribution area, which may include a coverage area of one or more access nodes, to the location metadata of the received alert to generate the modified alert with specific geographical content pertinent to the distribution area. In some embodiments, the distribution area may be limit and may include one or more wireless devices. Thus, the distribution area can include a specific location of a wireless device. In embodiments disclosed herein, the processing also includes determining a severity of the alert within the distribution area.

The alerts location metadata may include a location of the emergency. The processing formulates the content of the modified alert based on a distance and/or direction of the distribution area from the emergency location determined from the geographical information of the distribution area retrieved from memory at the edge locations or communicated from the wireless devices.

The content of the alert may also include a URL. When accessed, the URL may provide additional information about the emergency, such as impacted areas, evacuated areas, provided shelters, etc. The processing of the alert may include modifying the content to include information retrieved through the URL pertinent to the geographic location of distribution. The processing may include deep packet inspection to intercept the URL and filter URL content. Additionally or alternatively, the processing may include accessing a content delivery network (CDN) server to retrieve cached content pertinent to the emergency. The CDN server or CDN application may be co-located with the MEC system and regional alert system or accessible to the MEC system and regional alert system. The cached content can be pre-selected based on the modified alerts broadcast in a regional alert system zone of control (the sum of the areas of base stations under the control of the regional alert system). The regional alert system processes alerts and based on the URL for the localized area, the regional alert system notifies the CDN that particular content should be pre-staged so that it can be retrieved for alert distribution at the regional alert system at an edge location. This allows modification of the alert at the local edge while avoiding the need to access content from a centralized location such as the core network.

The processing may additionally include modifying the alert or its distribution pattern based on a severity of the received alert. The distribution pattern may include, for example, a distribution frequency, a distribution duration, and/or a distribution area. Additional factors may also be defined as constituting the distribution pattern. The severity of the alert may be reflected in the transmitted metadata. However, the processing may evaluate the severity of the received alert relative to the characteristics of the distribution area and determine a distribution frequency based on the severity of the received alert. Further, modifying the distribution pattern of the alert may include modifying the received metadata, which may include, for example, a repetition rate, distribution frequency, and/or security parameters.

Thus, through embodiments disclosed herein dynamically modify received alerts by determining a location of a distribution area or cell site relative to the location of an emergency referenced by an alert and tailor the broadcast, including both the timing and distribution to the one or more distribution areas. Rules based substitution may be utilized to create multiple unique alerts based on a single original alert. The unique alerts are tailored to the recipients of the alerts based on knowledge stored or accessed from the network edge In addition to the systems and methods described herein, the operations for dynamically distributing intelligent alerts may be implemented as computer-readable instructions or methods, and processing nodes on the network for executing the instructions or methods. The processing node may include a processor included in the access node or a processor included in any controller node in the wireless network that is coupled to the access node.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

Figure 1:
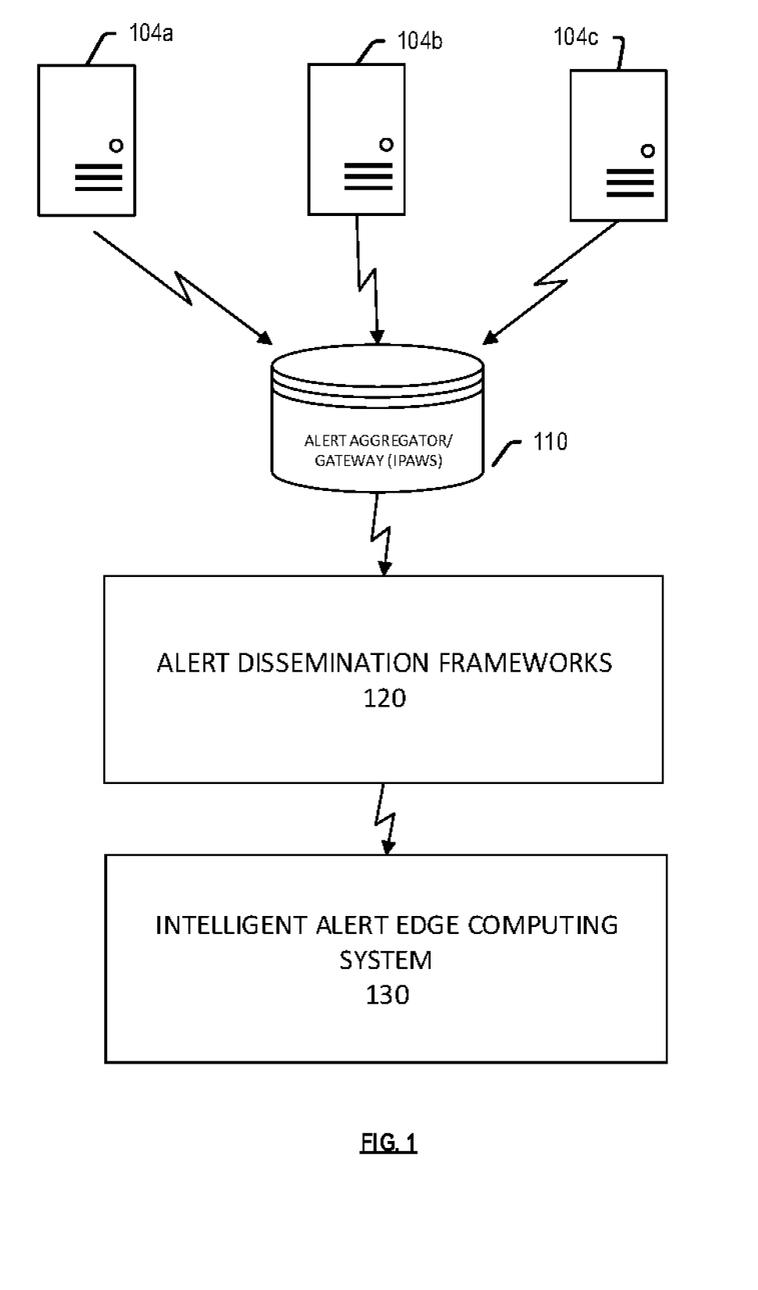
FIG. 1 depicts an exemplary operating environment system for employing a dynamic edge computing intelligent alert dissemination system in accordance with the disclosed embodiments.

FIG. 1 is a block diagram illustrating an alert distribution hierarchy in which embodiments disclosed herein may be implemented. Alerts typically originate with alerting authorities 104a, 104b, and 104c. The alerting authorities are public originators and may be automated systems. The alerting authorities may include, for example, the National Weather Service, the National Public Warning System, other national authorities, local authorities, state authorities, territorial authorities, and tribal authorities. Although only three alerting authorities are shown, it should be understood that a greater number of alerting authorities may communicate within the displayed framework.

The alerting authorities 104(a)-104(c) send alerts to an alert aggregator, such as the Integrated Public Alert and Warning System (IPAWS) 110. IPAWs is a national system for facilitating distribution of local alerts. IPAWS communicates using multiple alert dissemination frameworks 120. The alert dissemination frameworks may include, for example, the Emergency Alert System (EAS), which reaches radio and television channels, the Wireless Emergency Alert system (WEA), which reaches cellular phones, National Weather Radio (NWR), and other frameworks including Internet applications and websites. The alert specifies which framework and IPAWs 110 distributes the alert accordingly. Thus, the alert goes through the IPAWS 110 gateway through the frameworks 120 to all operators that signed up for service.

In embodiments disclosed herein, the WEA framework communicates with a novel intelligent alert edge computing system 130 in a wireless network in order to dynamically distribute intelligent alerts. WEA is a geo-targeted system that sends alerts to network operators located within a pre-defined area. The alerts include a text or content part and metadata. The metadata may include a start and stop time for broadcasting, an alert area, an alert identifier, and an alert type. The alert type may include, for example, a severity and a category. The alert time may include a start time and an end time for the alert. The alert area may be or include a geographic area described, for example, by geographic coordinates. The text or content part sent by WEA to the network operators is the same for the entire area of jurisdiction. Thus, the alert comes to the network operator at the system 130 and logic within the network selects target access nodes based on the alert metadata and stored information at the system 130. The target access nodes may further be linked to other networks, such as the public switched telephone network (PSTN) and the Internet.

The alerts may be modified and/or scheduled by the intelligent alert edge computing system 130 based on geographic targeting. The types of alerts may include, for example, tornado alerts, evacuation alerts, earthquake alerts, child abduction alerts, water contamination alerts, traffic alerts, power outage alerts, volcano alerts, wildfire alerts, law enforcement situations, blizzard alerts, flash flooding alerts, shelter-in-place alerts, or alerts pertaining to any other situation that may involve a threat to public safety. Technologies including mobile devices, internet services, sirens, digital road signs, etc. may convey alerts to the public.

Figure 2:
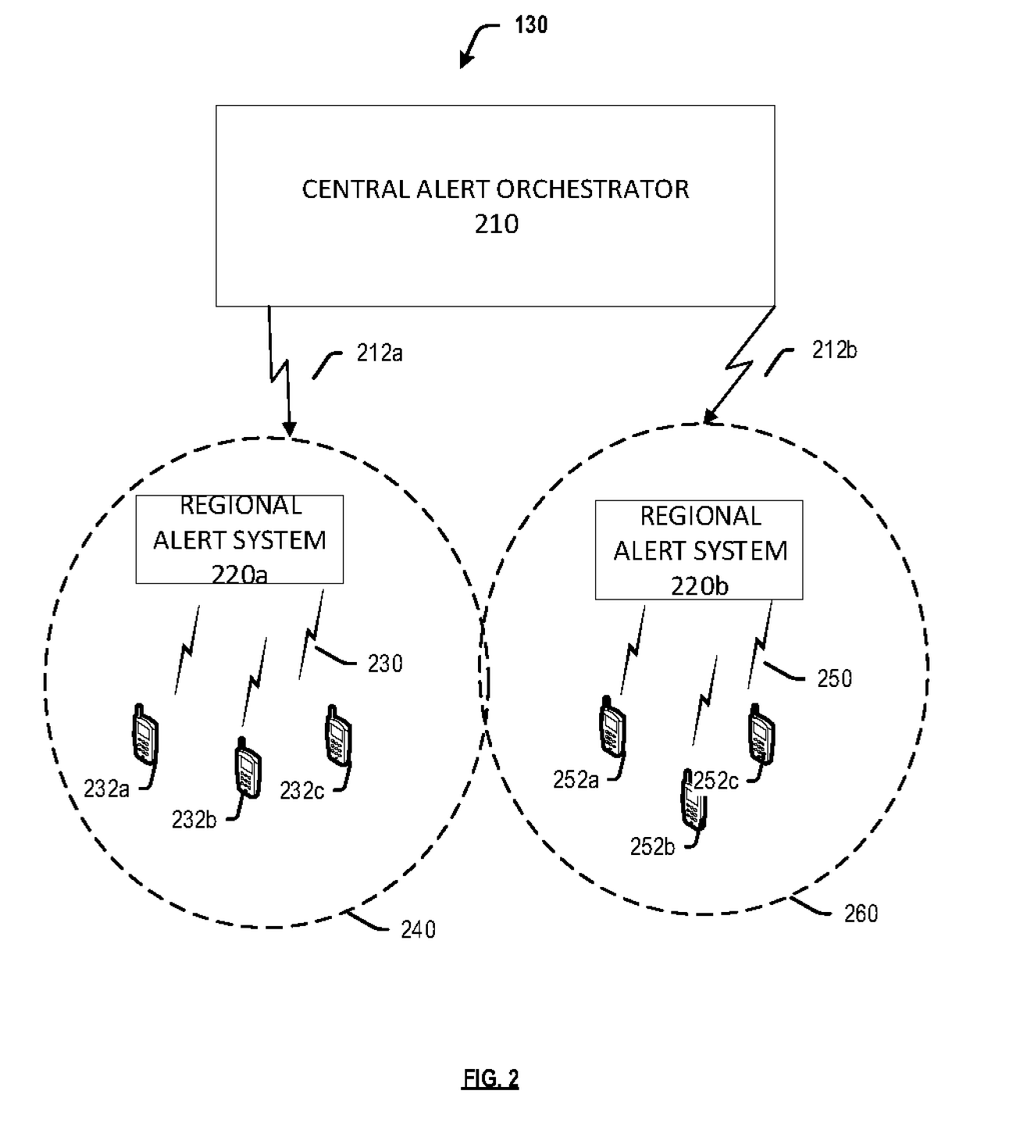
FIG. 2 illustrates an exemplary configuration of a dynamic edge computing intelligent alert dissemination system in accordance with disclosed embodiments.

FIG. 2 is a block diagram illustrating an embodiment of an intelligent alert edge computing system 130. The intelligent alert edge computing system 130 may include both a central alert orchestrator 210 and regional alert systems 220a, 220b. Although only two regional alert systems are shown, a larger number of regional alert systems may be utilized and may communicate with the central alert orchestrator 210.

The central alert orchestrator 210 may receive alerts from an alert originator through WEA or another existing framework. The central alert orchestrator 210 may process and distribute the received alerts to regional alert systems 220a, 220b at edge locations. The regional alert systems 220a and 220b process and distribute the alerts within their respective coverage areas 240, 260. Ultimately, wireless devices 232a-c within coverage area 240 receive the alerts from regional alert system 220a and wireless devices 252a-c may receive alerts within the coverage area 250 from the regional alert system 220b. A larger or smaller number of devices may be included in each coverage area. Various types of devices including Internet of things (IoT) devices may be connected over the network.

The central alert orchestrator 210 receives the original alert with the geographic information, and based on the geographic information distributes the alerts to the appropriate regional alert systems. The central alert orchestrator 210 accesses both a stored set of rules and a database of regional alert systems and is able to process the original alert for distribution to the appropriate regional alert systems based on the accessed information. Thus, the central alert orchestrator may compare metadata indicating a geographic location of the alert with target regional systems and match the geographic location to the target regional systems based on the stored rules.

This matching or selection by the central alert orchestrator 210 can take one of two forms. One form is that the central alert orchestrator 210 has a coverage map of every cell in the regional alert system or MEC zone and sends the list of specific cells that the alert is to be broadcast from based on the coverage to the MEC and corresponding regional alert system covering the zone. An alternate approach is that the central alert orchestrator 210 only has the information about the regional alert system zone coverage and sends the alert to the appropriate zones. The regional alert system thereby has the coverage information for each cell and decides which cells to broadcast the alert, possibly in the modified form described herein, from within its zone.

The regional alert systems 220a, 220b may be co-located with MEC systems at the edge locations and may receive the alerts from the central alert orchestrator 210 and localize the alerts to improve response to the alert. In embodiments set forth herein, the regional alert systems 220a and 220b may evaluate a coverage area 240 or 250 based on the location of ultimate recipients or the actual locations of the wireless devices 232a-232c and 252a-c, an emergency alert, such as a fire alert could be tailored to recipients to include a location of the fire relative to the recipients. Thus, based on a location of the fire relative to the recipient content of the original alert is modified. For example, an original alert might read "Fire in Somewheretown, avoid travel in that direction." A modified alert might include the text "Fire in Somewheretown, 10 miles north, avoid travel in that direction." Such a modification may be particularly useful to travelers who may not be familiar with the area in which they are traveling. Thus, an alert broadcast from regional system 220b may differ from an alert broadcast from regional system 220a. For example, regional system 220a may transmit an alert with the content "10 miles north" and regional system 220b may transmit an alert with the content "13 miles northwest" or other appropriate modification.

Additionally, alerts transmitted from the central alert orchestrator 210 to the regional alert systems 220a, 220b may include phone numbers or URLs. Because the alerts may originate through a national alert system, recipients in a wide area may be attempting to access the URLs and phone numbers, thus overloading the infrastructure. Accordingly, recipients may be unable to access the URL or phone number. For example, in the instance of a hurricane predicted to hit land and impact a broad area, television, radio, and wireless alerts may direct recipients to a public safety web site. The website may be inaccessible due to high traffic volumes and recipients are therefore unable to access safety information. Hence, the regional alert systems 220a, 220b at edge locations can parse the URL and provide critical information directly to devices to reduce congestion issues. For example, the regional systems 220a, 220b can determine evacuation sites from the URL and provide evacuation sites relevant to the recipients directly in the alert. For example, edge computing capabilities would allow an original alert text reading "Hurricane warning. See evacuation sites at safety.hurricane.gov" to be modified to read "Hurricane warning. Your nearest evacuation site is Central High School." Thus, edge computing capabilities of the regional alert systems 220a, 220b can reduce network congestion during a crisis. When the regional alert systems 220a, 220b receive alerts such as WEA alerts, the systems parse the URLs in the alert. Then, the systems use their edge computing capabilities to perform deep packet inspection (DPI) to filter URL content. Further, as set forth above, the regional alert systems may access a CDN server to modify the alerts using cached content pertinent to the emergency. CDN and DPI functionality may be deployed alone or together.

The DPI and CDN functionality could be triggered for either the duration of the alert and potentially additional time based on stored policies. Alternatively, the DPI and/or CDN functionality could be traffic load sensitive. Thus, the DPI and/or CDN functionality may be triggered when congestion or requests to access the URL or phone number reach a predetermined threshold. When the congestion or the request rate for the URL or phone number falls below a predetermined threshold, DPI and/or CDN functionality may be terminated as recipients are likely to be able to access the central web server/platform hosting the URL or phone number. The threshold may be or include a number of devices attempting to access the URL or phone number, or alternatively a noise level or other measure of congestion.

Furthermore, alert distribution and content can be modified at the regional alert systems 220a, 220b to improve accuracy and response. Edge alerts or alerts tailored by the regional alert systems 220a, 220b can be described to have a concentric ring of alerts with different text. For instance, alerts with high severity level could be designated for rapid delivery. Alerts with lower severity level could be programmed for 'best effort' or slower delivery. Additionally, individual alerts can be created and targeted to specific recipients based on different severity levels. Further, the regional alert systems 220a, 220b can create multi-shape alerts and if there are overlaps in between the alerts, and can decide which alerts to broadcast in which area and to what devices.

Figure 3:
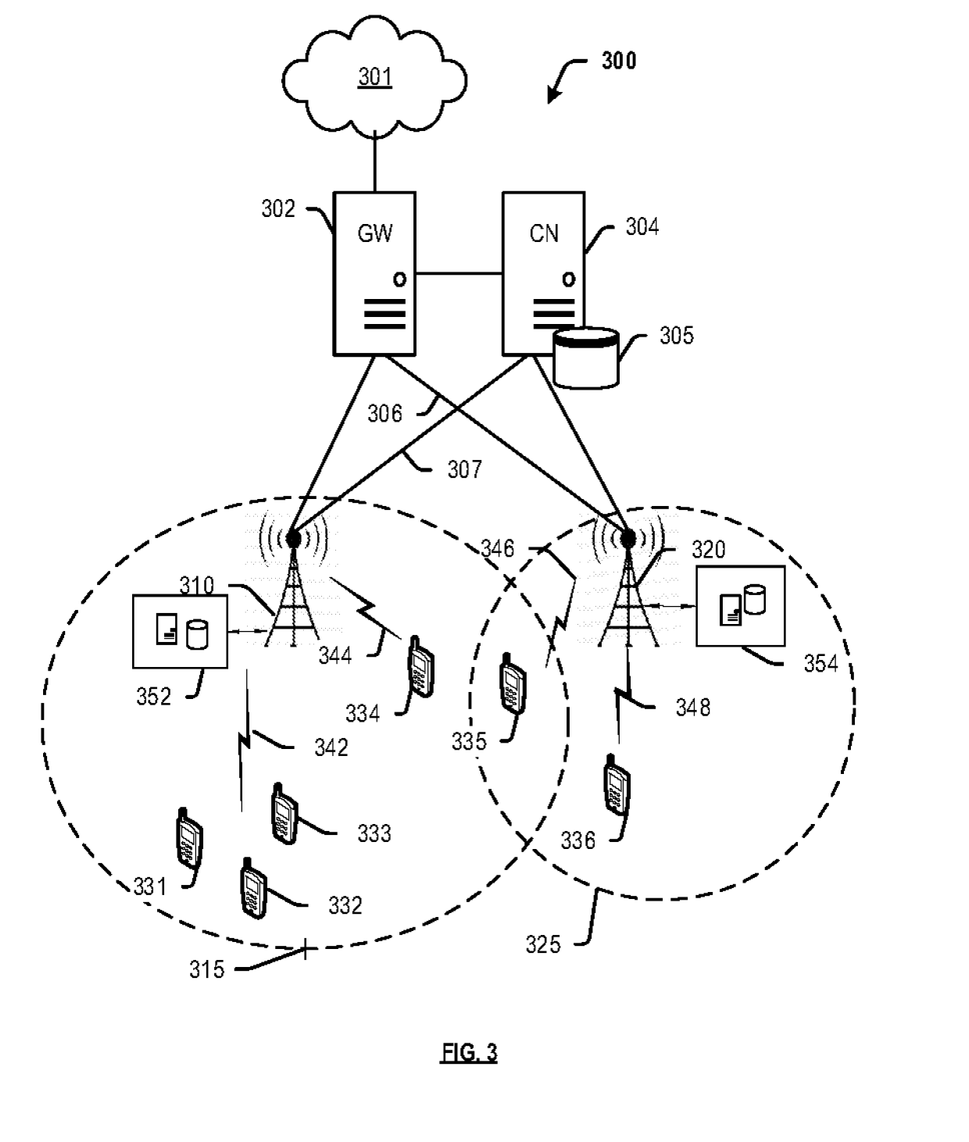
FIG. 3 illustrates an exemplary configuration of dynamic intelligent alert edge computing system operating in a network in accordance with disclosed embodiments.

FIG. 3 illustrates an exemplary configuration of a wireless communication system 300 in which the dynamic intelligent alert edge computing system 130 operates in accordance with disclosed embodiments. System 300 may include a communication network 301, a gateway 302, a controller node 304, and a database 305. The aforementioned components may be part of a core network, which in embodiments set forth herein may be a core network having a service based architecture (SBA). The central alert orchestrator 210 described above may be located within the core network or in close proximity to the core network.

The communication system 300 further includes one or more access nodes 310 and 320. One or more end-user wireless devices may be directly connected to access nodes 310, 320 such as end-user wireless devices 331, 332, 333, 334, 335, 336. Furthermore, one or more MEC systems 352, 354 may be co-located with the access nodes 310, 320 or in direct communication with the access nodes 310, 320. The MEC systems 352, 354 may include both an MEC server and CDN server or database as illustrated. The regional alert systems 220a, 220b described above as being located at edge locations may be co-located with the MEC systems 352, 354. In embodiments, in addition to MEC systems 352, 354, an MEC orchestrator for coordinating activities of the MEC systems may also be included within the communication system 300. Furthermore, the MEC systems may be deployed at various location such as central data centers, regional data centers, or cell sites and the displayed embodiment should not be construed as limiting. The regional alert systems 220a, 220b may be deployed at any of these locations and may comprise an application executed within the MEC. Various applications including DPI and CDN applications may be included within the MEC systems 352, 354. Further, although the MEC systems 352, 354, are shown as communicating with corresponding access nodes 310, 320, it should be understood that multiple access nodes are likely to positioned within control of a single MEC system and corresponding regional alert system. Thus, for example, multiple gNBs may be under the control of a single regional alert system.

In this exemplary embodiment, access nodes 310, 320 may be macrocell access nodes configured to deploy at least two different carriers, each of which utilizes a different RAT air interface. For example, a first carrier may be deployed by access node 310 in a long term evolution (LTE) mode, and a second carrier may be deployed by access node 310 in new radio (NR) mode. Thus, in an embodiment, access node 310 may comprise two co-located cells, or antenna/transceiver combinations that are mounted on the same structure. In some embodiments, multiple access nodes 310 may be deployed and each access node 310 may support a different RAT. For example, a next generation NodeB (gNodeB) may support new radio (NR) and an evolved NodeB (eNodeB) may provide LTE coverage. Further, later developed RATs may be utilized. In other embodiments, the access node 310 may utilize a single RAT, for example, a 5G NR RAT.

Wireless devices 331-336 are illustrated as being in communication with access nodes 310 and 320 over various types of communications links. Each of the end-user wireless devices 331-336 may be attached to the wireless air interface deployed by access nodes 310 and 320. The wireless links that directly couple end-user wireless devices 331-336 with access nodes 310 and 320, as shown in FIG. 3, form the wireless network (or wireless radio air interface) deployed by access nodes 310 within coverage areas 315 and 325. The wireless devices 331-336 may communicate with the access nodes 310 and 320 using, for example, NR communications links 342 and 344, 346, and 348. The NR communication links 342, 344, 346, and 348 may comprise any communication channel that utilizes air-interface resources of an NR carrier deployed by access node 310. Other configurations are within scope of the disclosure.

Access nodes 310 and 320 may be any network node configured to provide communication between end-user wireless devices 331-336 and relay nodes 340 and 342 and communication network 301, including standard access nodes such as a macro-cell access node, a base transceiver station, a radio base station, gNodeB in 5G NR, or the like. For example, access node 310 may implement 5G NR technologies to deploy a wireless network that supports frequency bands ranging from, e.g., 600 MHz to 100 GHz. In some embodiments, access node 310 may deploy a wireless network that supports frequency bands ranging from 3 GHz to 100 GHz. In some embodiments, access node 310 may deploy a wireless network that supports multiple frequency bands selected from 3 GHz to 100 GHz. In an exemplary embodiment, a macro-cell access node 310 may have a coverage area 315 in the range of approximately five kilometers to thirty-five kilometers and an output power in the tens of watts. In an embodiment, access nodes 310 and 320 may comprise two co-located cells, or antenna/transceiver combinations that are mounted on the same structure. Any other combination of access nodes and carriers deployed therefrom may be evident to those having ordinary skill in the art in light of this disclosure.

Access nodes 310 and 320 can comprise a processor and associated circuitry to execute or direct the execution of computer-readable instructions to perform operations such as those further described herein. Briefly, access nodes 310 and 320 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 310 and 320 can receive instructions and other input at a user interface. Access nodes 310 and 320 communicate with gateway node 302 and controller node 304 via communication link 306. Access node 310 may communicate with other access nodes such as access node 320 and other access nodes, using a wireless link or a wired link such as an Xn interface.

Additionally, the nodes may include relay nodes or other nodes requiring high performance. Relay nodes improve service quality by relaying communication between an access node, and end-user wireless devices in the wireless network. For example, relay nodes may be used at the edge of a coverage area of an access node to improve coverage and/or service as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach.

Wireless devices 331-336 may be any device, system, combination of devices, or another such communication platform capable of communicating wirelessly with access nodes 310 and 320 using one or more frequency bands and wireless carriers deployed therefrom. Each of wireless devices 331-336 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible. Communication network 301 may be a wired and/or wireless communication network. Communication network 301 may include processing nodes, routers, gateways, and physical and/or wireless data links for communicating signals among various network elements. Communication network 301 may include one or more of a local area network, a wide area network, and an internetwork (including the Internet).

Communication network 301 may be capable of communicating signals and carrying data, for example, to support voice, push-to-talk, broadcast video, and data communications by end-user wireless devices 331-336. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 301 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 301 may include additional base stations, controller nodes, telephony switches, internet routers, network gateways, computer systems, communication links, or other type of communication equipment, and combinations thereof. The wireless network provided by access nodes 310 and 320 may support any of the above-mentioned network protocols.

Communication link 306 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 306 may include Si communication links. Other wireless protocols may also be used. Communication link 306 may be a direct link or may include various intermediate components, systems, and networks. Communication link 306 may enable different signals to share the same link.

Gateway 302 may be a network node configured to interface with other network nodes using various protocols. Gateway 302 may communicate data (e.g., data related to a user) over system 300. Gateway 302 may be a standalone computing device, computing system, or network component, and may be accessible, for example, by a wired or wireless connection, or through an indirect connection such as through a computer network or communication network. For example, gateway 302 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 302 may include a processor and associated hardware circuitry configured to execute or direct the execution of computer-readable instructions to obtain information. Gateway 302 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 302 may receive instructions and other input at a user interface.

Controller node 304 may be a network node configured to communicate information and/or control information over system 300. For example, controller node 304 may be configured to transmit information associated with a smart alert. Controller node 304 may be a standalone computing device, computing system, or network component, and may be accessible, for example, by a wired or wireless connection, or through an indirect connection such as through a computer network or communication network. For example, controller node 304 may include one or more of an Access and Mobility Management Function (AMF), a Unified Data Repository (UDR), a Policy Control Function (PCF), an Authentication Server Function (AUSF) and User Data Management (UDM), a rights management server (RMS), a subscriber provisioning server (SPS), a policy server, etc. The controller node 304 may further operate as an element management system that controls access nodes in the network 301. The controller node may utilize 5G NR or other network architecture and/or protocol.

Controller node 304 can comprise a processor and associated circuitry to execute or direct the execution of computer-readable instructions to obtain information. Controller node 304 can retrieve and execute software from storage, which can include a disk drive, a flash drive, memory circuitry, or some other memory device, and which can be local or remotely accessible. In an exemplary embodiment, controller node 304 includes the database 305 for storing information related to elements within system 300, such as carriers deployed by access nodes 310, 320 power classes, and carrier aggregation capabilities of wireless devices 331-336. This information may be requested by or shared with access node 310 via communication link 106, Xn connections, and so on. The database 305 may additionally store target area information enabling correlation of target areas with edge locations for the purpose of formulating intelligent alerts. The database 305 may further store software comprising computer programs, firmware, or some other form of machine-readable instructions, and may include an operating system, utilities, drivers, network interfaces, applications, or some other type of software, and combinations thereof. For example, a processing node within controller node 304 can perform the operations described herein. Further, controller node 304 can receive instructions and other input at a user interface.

Other network elements may be present in system 300 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 310 and communication network 301.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 300 may be, comprise, or include computers systems and/or processing nodes, including access nodes, controller nodes, and gateway nodes described herein.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 300 may, comprise, or include computers systems and/or processing nodes. This includes, but is not limited to: access nodes 310, 320, controller node 304, and/or network 301.

Figure 4:
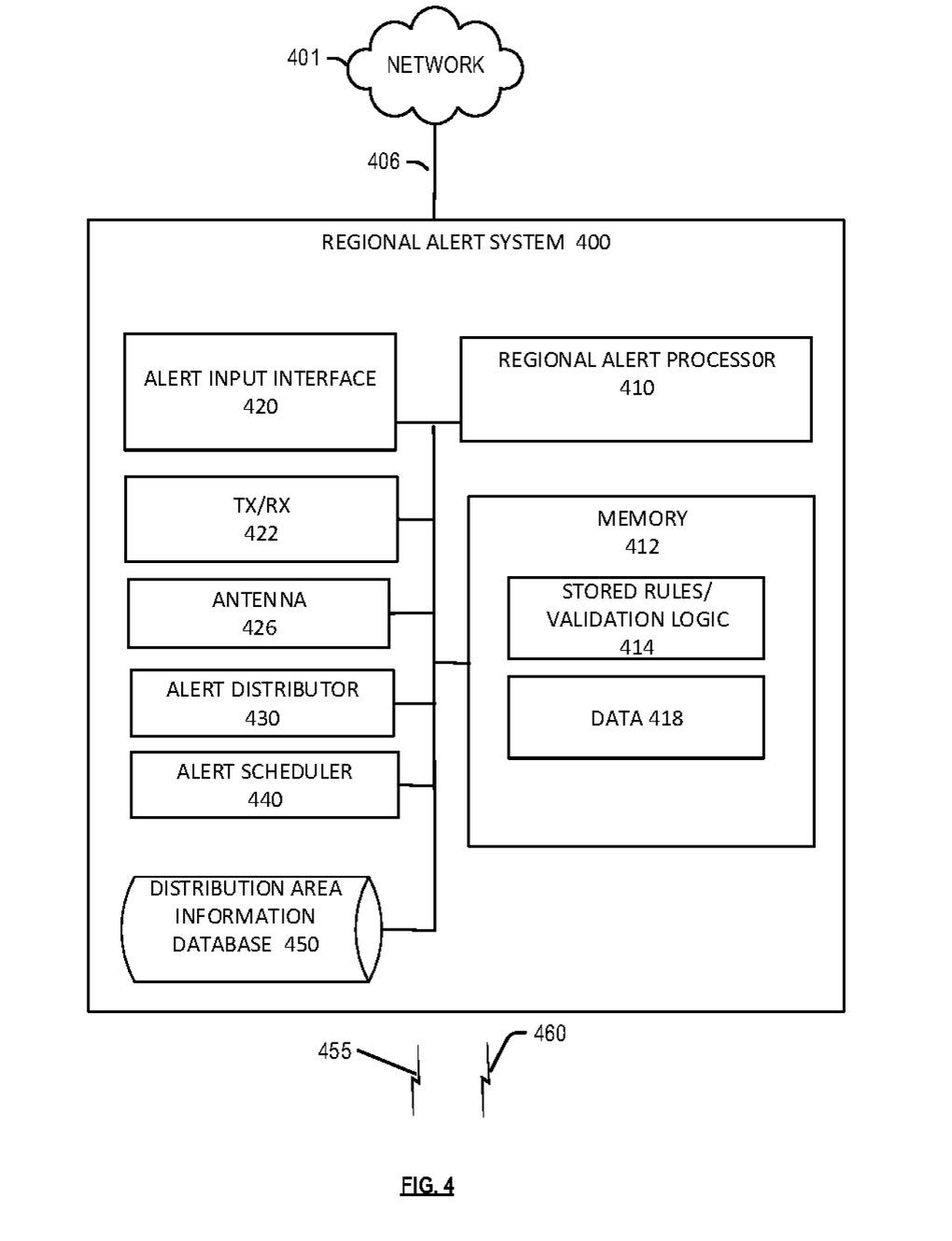
FIG. 4 depicts a regional alert system in accordance with disclosed embodiments.

FIG. 4 depicts an exemplary regional alert system 400. The regional alert system 400 may be incorporated in an access node or MEC system such as that discussed above with reference to FIG. 3. The regional alert system 400 may operate to modify received alerts, thereby creating intelligent alerts for distribution from an edge of the network. The regional alert system 400 is illustrated as comprising a regional alert processor 410, memory 412, alert input interface 420, transceiver 422, antenna 426, alert distributor 430 and alert scheduler 440. The regional alert system 400 may also include a distribution area information database 450. Regional alert processor 410 executes stored rules/validation logic 414 stored in memory 412 and may also utilize stored data 418, while transceiver 422 and antenna 426 enable wireless communication with other network nodes, such as wireless devices and other nodes.

The memory 412 stores rules and validation logic 414 pertinent to the coverage area of the access node (e.g. nodes 310, 320) which is also the distribution area of the regional alert system 400. For example, the memory 412 may store geographical coordinates of the coverage area as data 418. Furthermore, the memory may store location specific rules for the coverage area as well as additional location specific information. For example, the memory 412 may store a list of access nodes, such as gNBs, under control of the regional alert system 400 along with a mapping of cells to each gNB. The regional alert system processor 410 may determine cell coverage overlap with the alert coverage determined by the central alert orchestrator to develop a list of cells for broadcasting of the alert, whether modified or unmodified. The processor 410 may further assemble the alerts into lists for each access node under the control of the regional alert system.

Additionally, the processor 410 may be capable of accessing information external to the access node, for example, URLs over the internet. For example, the regional alert system 400 may be configured to process an alert received from the central alert orchestrator in order to create an intelligent alert. The regional alert system 400 may be further configured to process the alert by determining a location of an emergency based on alert content and modify the alert based on the target recipients and the location of the emergency. The regional alert system 400 may further assess severity of the alert based on the alert content for a target location. The access node may further parse alert content, such as a URL and modify the alert content by including information accessible through the URL. Alert scheduler 440 may be provided for scheduling delivery of the intelligent alerts to particular target locations. Scheduling may include start and stop times for sending the alert and frequency determination for the alerts. The alert scheduler 440 may serve to modify metadata attached to the received alert. Network 401 may be similar to network 301 discussed above. Further, instructions stored on memory 412 can include instructions for dynamically modifying received alerts based on target locations and alert metadata, which will be further explained below with reference to FIGS. 6-8.

Figure 5:
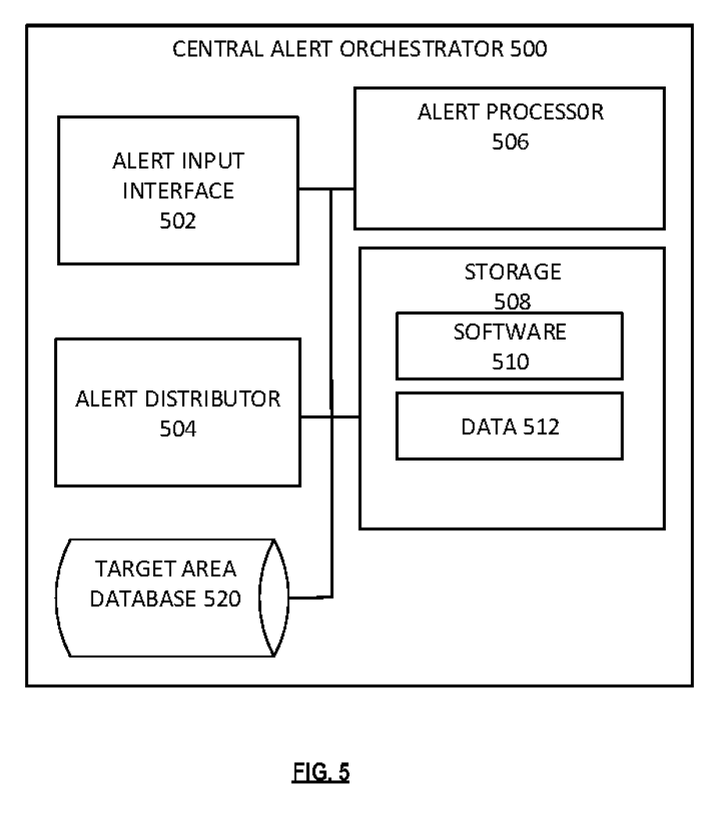
FIG. 5 depicts a central alert orchestrator in accordance with the disclosed embodiments.

FIG. 5 illustrates a central alert orchestrator 500, which may be located, for example within control node 304 of FIG. 3 or at a location nearer to the network core than the illustrated MEC systems. The central alert orchestrator 500 may receive alerts from external sources at an alert input interface 502. The alert input interface may be or include a transceiver such as that described above with reference to FIG. 4 or any other mechanism capable of receiving alerts from WEA or other framework configured to distribute alerts to the network. An alert processor 506 may process the received alerts using rules 510 stored in the storage area 508. The processing of the alert processor 506 includes determining a distribution pattern of the alerts based on information stored in the target area database 520. For example, the alert processor 506 may determine target edge locations. The alert processor 506 may perform this function by determining a list of cells to broadcast from and identifying the corresponding regional alert systems or MEC systems so that each regional alert system receives a list of cells within its coverage area that should be targeted with the alert. The alert processor 506 may direct an alert distributor 504 to transmit the received alerts to the target edge locations. The alert distributor 504 may be or include a transceiver or other mechanism capable of distributing alerts to the MECs or regional alert systems. As set forth above, the central alert orchestrator 500 may be included in a control node such as control node 304.

Figure 6:
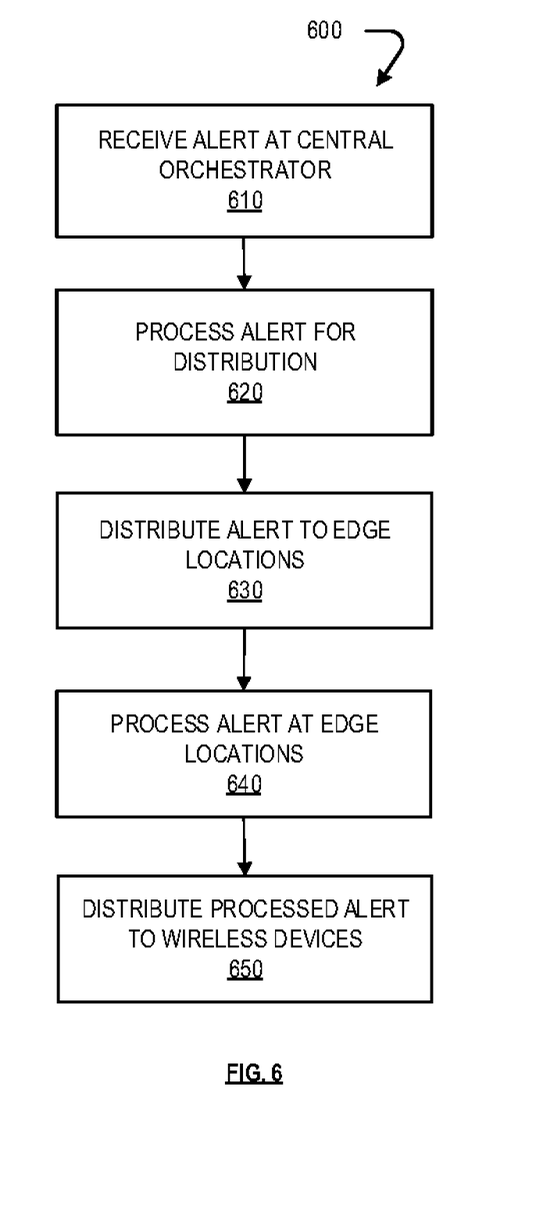
FIG. 6 depicts an exemplary method for dynamically managing alerts in accordance with disclosed embodiments.

The disclosed methods for dynamically managing alerts and distributing intelligent alerts are discussed further below. FIG. 6 illustrates an exemplary method 600 for dynamically managing alerts in order to create intelligent edge alerts within the network. Method 600 may be performed by any suitable processor discussed herein, for example, a processor included in access node 310 or 320 as well as processor included, for example, in the control node 304 of FIG. 3. These processors may also correspond to the processor 410 in the regional alert system 400 (FIG. 4) and the alert processor 506 of the central alert orchestrator 500 (FIG. 5). For discussion purposes, as an example, method 600 is described as being performed by both the alert processor 506 and the access node processor 410.

Method 600 begins in step 610, when an alert is received at the alert input interface 502 of the central alert orchestrator 500. The alert received originated with an alerting authority and may have been distributed through the IPAWS gateway and WEA framework or another suitable framework. The alert processor 506 processes the received alert in step 620. The processing in step 620 may include utilizing information in the target area database 520 and stored rules in the storage area 508 to determine a distribution pattern for the alert. For example, the processor of the central alert orchestrator 500 correlates target locations with network edge locations in order to determine locations for alert distribution. The target locations may be determined by the alert processor 506 based on geographic metadata included with the original alert.

In step 630, the alert processor 506 instructs the alert distributor to 504 to distribute the alert to edge locations based on the processing performed in step 620. The alert is received at the edge locations in step 640. The edge locations may for example, be located at access nodes such as access node 310, 320 and the alerts may be received by transceiver 422. At step 650, a processor, such as the regional alert processor 410 processes the received alert at the edge location. The processing may include multiple steps impacting the content and distribution pattern of the alert. The processing is further discussed below in conjunction with FIG. 7. At step 660, the access node distributes the processed alert to wireless devices. The wireless devices include some or all of the wireless devices located in the coverage area of the access node.

Figure 7:
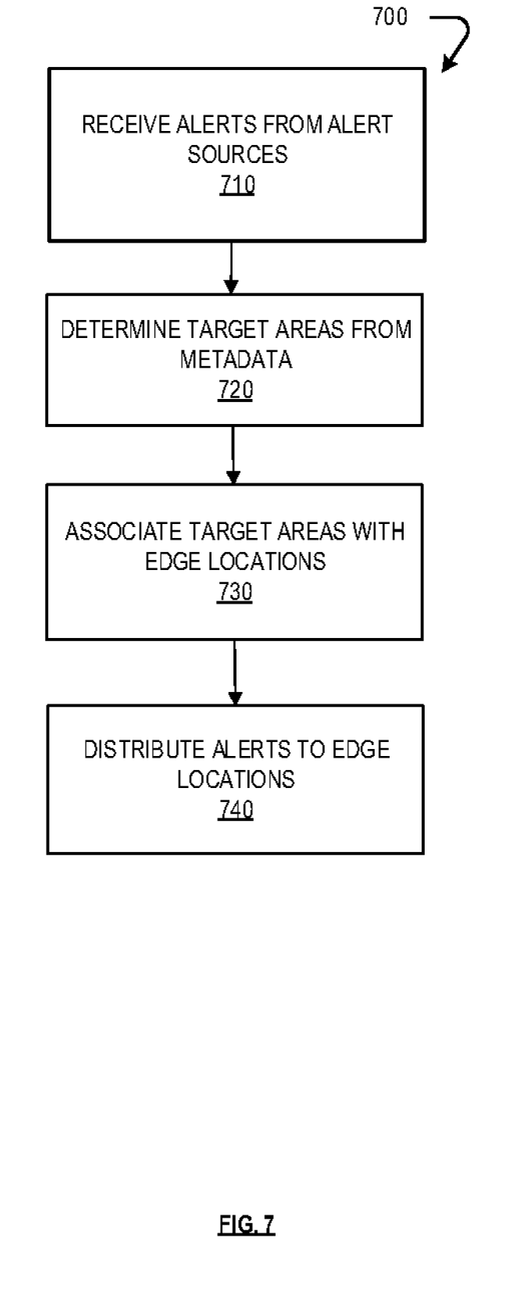
FIG. 7 depicts an exemplary method for managing alerts at the central alert orchestrator in accordance with disclosed embodiments.

FIG. 7 illustrates further details of processing of the alerts received at the central alert orchestrator. Method 700 may be performed by any suitable processor discussed herein, for example, a processor included in the controller node 304 or the alert processor 506 of the central alert orchestrator 500. For discussion purposes, as an example, method 700 is described as being performed by the alert processor 506.

The alerts are received in step 710 as set forth above. The alerts are distributed to the central alert orchestrator through one of the alert distribution frameworks described above, e.g., WEA, and are received by the system 300. The processing is performed at steps 720 and 730 by determining target areas from metadata included with the alert at step 720. The metadata may for example include an area covered by the alert, defined, for example, by its geographic coordinates. In step 720, the processor 506 may located target areas in the network based on the metadata. In step 730, the central alert orchestrator associates the identified target areas with edge locations using the database and stored rules. For example, the processor 506 determines a list of cells to broadcast from and divides them based on corresponding regional alert system control, so that each regional alert system and corresponding MEC receives a list of cells under its control that should receive the alert. In step 740, the central alert orchestrator distributes the alerts to the regional alert systems at the edge locations.

Figure 8:
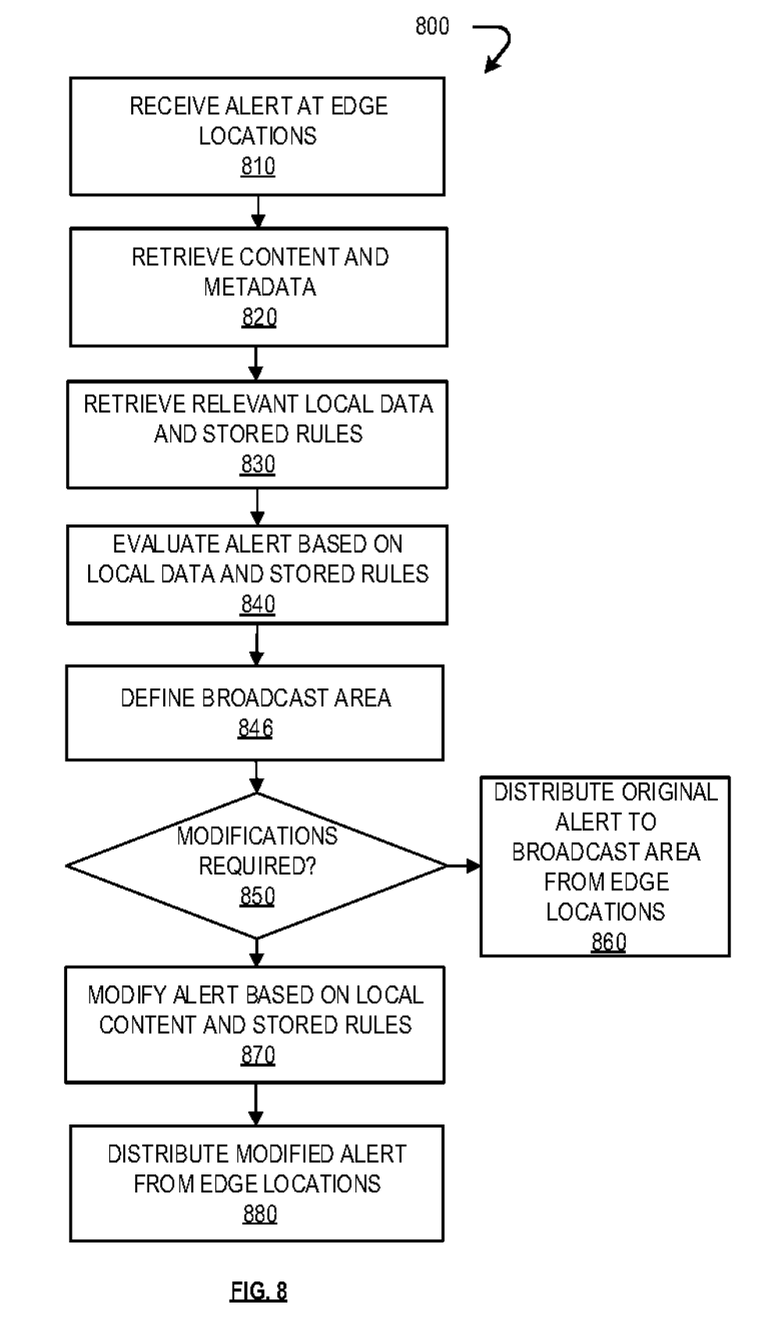
FIG. 8 depicts an exemplary method for dynamically managing alerts using edge computing capabilities at the regional alert systems in accordance with disclosed embodiments.

FIG. 8 depicts an exemplary method for dynamically managing alerts using edge computing capabilities at the regional alert system in accordance with disclosed embodiments. Method 800 may be performed by any suitable processor discussed herein, for example, a processor included in regional alert system 220a or 220b, a processor located in the MEC, the processor in access nodes 310 or 320, or the regional alert processor 410 of the regional alert system 400. For discussion purposes, as an example, method 800 is described as being performed by the regional alert processor 410. In step 810, an alert is received at edge locations. The edge locations may comprise an MEC and regional alert systems. The regional alert systems and MEC may, for example, be located at, or in communication with one or more access nodes. The alerts may be received, for example, by a transceiver of the access node.

In step 820, the regional alert processor 410 at the edge location facilities may retrieve the content and metatdata of the alert. Metadata may include information such as the duration of the alert and the distribution area of the alert. The content is the actual content of the alert as received at the central alert orchestrator and transmitted to the regional alert systems. In step 830, the regional alert processor 410 of the regional alert system 400 or edge location facility may retrieve relevant local data and stored rules from the memory of the regional alert system 400, from databases located in the MEC systems, or from any other source accessible to the edge location facility.

In step 840, the processor, such as the regional alert processor 410 may evaluate the alert based on the local data and the stored rules. The evaluation may include evaluating the content of the alert to determine if modifications to the content are required based on the stored rules and the metadata. The evaluation may also include evaluating a distribution pattern of the alert based on the stored rules and metadata. The distribution pattern may include, for example, a distribution area, a distribution frequency, a distribution speed, a distribution priority and/or other distribution parameters.

In step 846, the processor determines the broadcast area of the alert. For example, the regional alert system may have access to information pre-provisioned for mapping of cells to access nodes in its area of coverage. For example, the regional alert system may access a database and a mapping of cells to each access node under control of the regional alert system and corresponding MEC system. The regional alert system then determines cell coverage overlap with the alert coverage to develop a list of cells for broadcast. The regional alert system thereby generates a list of cells under access node control to which the alert, either in its original or modified form, will be broadcast.

Based on the evaluation of step 840, in step 850, the regional alert processor 410 determines if modifications to the content of the alert are required and/or if modifications to the metadata of the alert are required. If no modifications are required, in step 860, the regional alert system 400 at edge location facility distributes the original alert in accordance with received distribution parameters. The distribution is made to wireless devices located within the coverage area of the regional alert system 400. The distribution may be accomplished, for example, utilizing an alert distributor 430 or any combination of alert distributor 430, antenna 426 and transceiver 422 to distribute the alert to access nodes, for example gNBs, within the coverage area of the alert. However, if modifications are required to either content of the alert and/or the distribution pattern, the process moves to step 870.

In step 870, the regional alert processor 410 at the edge location facility modifies the alert based on the retrieved local content and stored rules. In step 880, the edge location facility distributes the modified alert from the edge locations. In some embodiments, both the content of the alert and the metadata, and thereby the distribution pattern of the alert may be modified. However, in other embodiments either the content of the alert or the metadata may be modified. Accordingly, in one scenario, the original alert, may be distributed with a modified distribution pattern. In another scenario, a modified alert may be distributed with the original distribution pattern and in yet a further scenario, a modified alert may be distributed with a modified distribution pattern.

Thus, in step 870, the regional alert processor 410 at the edge location localizes alerts received from the central alert orchestrator by injecting data into the content or text of the alert for specific target areas. Alternatively, the processor removes or modifies information in the content or text of the alert forwarded by the central alert orchestrator.

In further embodiments, in step 870, the processor locates parses a URL in the content or text portion of the alert to ascertain the information provided by the URL and inject location relevant information from the URL into the content or text of the alert. Such a modification ensures that target recipients receive essential information. In instances of high traffic or congestion, the URL may become inaccessible. Thus, the proposed processing diminishes network congestion as the target recipients will not be compelled to access the URL. For example, the URL may contain information about shelters available for those evacuating due to a hurricane impacting a large geographical area. For each regional alert system at an edge location, the corresponding regional alert processor could extract the relevant shelter and inject the information into the alert for distribution to the recipients in the relevant location. In embodiments, the DPI can re-direct the request to the CDN, to obviate the need for accessing a central server. This processing could include implementing a DPI application at the regional alert system or MEC as set forth above. The DPI may be triggered based on a threshold number of devices attempting to access the original URL, or based on another threshold parameter indicative of network congestion. The DPI may be triggered when the threshold is met and discontinued when the threshold is no longer met.

Further, in step 870, the alert processor may pre-position cached CDN content based on modifications performed at the regional alert system. This process can be implemented with the regional alert system providing a general CDN covering the MEC with pointers, e.g. URLs, to content for pre-positioning based on the alert message contents. Alternatively, the CDN can be co-located with the regional alert system and MEC so as to be dedicated to handling modifications of alert-related content. The regional alert system processes alerts and based on the URL for the localized area, the regional alert system notifies the CDN that particular content should be pre-staged so that it can be retrieved for alert distribution at the regional alert system at an edge location. This allows modification of the alert at the local edge while avoiding the need to access content from a centralized location such as the core network, thus reducing the burden on core network resources and providing improved service to end users.

For example, the alert processor may replace a nationwide map accessible through the original alert with a map of the distribution area for the regional alert system cached for retrieval. The alert processor may highlight the area of the emergency on the retrieved map. The map may be provided directly in the alert or a URL pointing to the map may be provided within the alert.

As an additional example, the alert received from the central alert orchestrator may contain directional information, such as a storm coming from the NW direction at a specific speed. The regional alert processor 410 of the edge computing system may localize this information in several ways. For example, based on the known location of alert recipients, the regional alert processor 410 may determine when the storm will reach the recipient location. Further, based on the recipient location and direction of travel and maps accessed by the processor, the regional alert processor 410 may select a route for avoiding the storm and inject the route into the alert for the corresponding recipient. To improve alert accuracy, the regional alert processor 410 may create concentric ring of alerts with different text. Accordingly, the accuracy of the alert is improved for the intended recipient. To tailor the alerts to the intended recipients, the regional alert processor 410 may utilize characteristics of an entire coverage area, or alternatively, may tailor alerts to individual wireless devices based on the location of the wireless device as measured by the regional alert processor 410 or as reported by the wireless devices periodically to the regional alert processor 410.

Furthermore, the processor may determine a severity level of the received alert at the recipient locations. For example, with an earthquake alert, the processor may determine a severity attached to the alert by ascertaining a distance of the recipient from the epicenter. The closer the recipient is to the epicenter, the higher the severity level attached to the alert. If severity level is high, the processor may tag the alert for faster and/or more frequent delivery than an alert with a lower severity level. Furthermore, the content of the alert may be modified as set forth above to include a recipient distance from the epicenter in the text or content of the alert.

Thus, each edge computing platform can modify alerts to tailor to local conditions based on different stored rules at each edge computing platform. This approach maintains simplicity as the central alert orchestrator simply determines locations for distribution and allows each regional alert system in the edge computing platform to tailor its own alerts based on stored rules for the corresponding target cell site. In this manner, a single alert received from the central alert orchestrator potentially becomes a different alert at each of the multiple edge computing platforms.

Accordingly, the processor modifies alerts in step 870 based on factors such as distance of the cell site from the emergency, the time of the emergency based on rate of travel or propagation, the direction of and speed of travel of the wireless device, and the location of the wireless device. Furthermore, multiple alerts may be created and distributed to different regions based on these factors.

Additionally, the regional processor 410 can process the alert by determining how often the alert should be sent to specific locations. While the original alert typically contains metadata related to frequency, location based rules can be utilized to modify the original frequency. For example, in a rural area, rebroadcasting may be less important than in an urban area, due to the likelihood of interference in the urban area. Thus, the regional processor 410 may modify the metadata to change the frequency or duration of the alert.

In some embodiments, methods 600, 700, and 800 may include additional or fewer steps or operations. Furthermore, the methods may include steps shown in each of the other methods. As one of ordinary skill in the art would understand, the methods 600, 700, and 800 may be integrated in any useful manner. Further, the order of the steps shown is merely exemplary and the order of steps may be rearranged in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method comprising:
receiving, at a central alert orchestrator of a wireless carrier, an alert from United States Emergency Integrated Public Alert and Warning System (IPAWS) generated by one or more alerting authorities comprising one or more of a national authority, local authority, state authority, territorial authority, and tribal authority at a network edge computing system serving wireless devices within a distribution area, the received alert from IPAWS including content and location metadata;
processing, at the central alert orchestrator of the edge computing system, the received alert from IPAWS in order to transmit to a regional alert system of the edge computing system of the wireless carrier, the processing including evaluating the alert based on characteristics of the distribution area;
determining, at the central alert orchestrator, a list of cells within the distribution area of the regional alert system of the wireless carrier;
comparing geographical information related to the distribution area to the location metadata of the received alert to generate a modified alert with specific geographical content pertinent to the distribution area;

modifying, at the regional alert system of the edge computing system, the content of the processed alert based on a location of at least one wireless device within the list of cells within the distribution area of the regional alert system to create the modified alert with local content; and distributing the modified alert to the at least one wireless device within the list of cells within the distribution area of the regional alert system of the wireless carrier.

2. The method of claim 1, wherein the received alert further comprises metadata including timing metadata and alert type metadata and the method includes modifying the metadata of the received alert.

3. The method of claim 2, wherein the processing comprises accessing stored information to determine the characteristics of the distribution area, wherein the stored information comprises at least geographical information.

4. The method of claim 1, wherein the location metadata includes an emergency location and the content of the modified alert is based on at least one of a distance and direction from the emergency location determined from the geographical information of the distribution area.

5. The method of claim 1, wherein the content includes a URL and the modifying the content includes deep packet inspection to intercept the URL and filter URL content.

6. The method of claim 1, wherein the processing further comprises determining a severity of the received alert relative to the characteristics of the distribution area and determining a distribution frequency based on the severity of the received alert.

7. The method of claim 1, further comprising determining, at the central alert orchestrator, the list of cells within the distribution area of the regional alert system for receiving the alert and transmitting the received alert to the regional alert system.

8. The method of claim 7, further comprising processing the alert at the regional alert systems and requesting that a content delivery network (CDN) at the edge computing system pre-stage content for retrieval during alert distribution.

9. A system comprising:
a central alert orchestrator of a wireless carrier; and
multiple geographically distributed edge computing systems of the wireless carrier serving wireless devices within a distribution area, each edge computing system comprising at least one processor configured to:
receive alerts from United States Emergency Integrated Public Alert and Warning System (IPAWS) at the central alert orchestrator, the alerts including content and location metadata generated by one or more alerting authorities comprising one or more of a national authority, local authority, state authority, territorial authority, and tribal authority;
process, at the central alert orchestrator, the received alerts from IPAWS in order to transmit to a regional alert system of the wireless carrier of the edge computing system, the processing including evaluating the alerts based on characteristics of the distribution area of the regional alert system of the wireless carrier;
compare geographical information related to the distribution area to the location metadata of the received alert to generate modified alerts with specific geographical content pertinent to the distribution area;
determine, at the central alert orchestrator, a list of cells within the distribution area of the regional alert system of the wireless carrier;
modify, at the regional alert system, the content of the received alerts based on a location of at least one wireless device within the list of cells within the distribution area of the regional alert system to create the modified alerts with local content; and
distribute the modified alerts to the at least one wireless device within the list of cells within the distribution area of the regional alert system of the wireless carrier.

10. The system of claim 9, wherein the content includes a URL and modifying the content includes deep packet inspection to intercept the URL and filter URL content.

11. The system of claim 9, wherein the processor is further configured to determine a severity of the received alert relative to the characteristics of the distribution area and determine a distribution frequency based on the severity of the received alert.

12. The system of claim 9, wherein the processing of the received alerts comprises processing the alert at the edge computing system at an edge location and requesting that a content delivery network (CDN) at the edge location pre-stage content for retrieval during alert distribution.

13. The system of claim 9, wherein the received alert further comprises metadata including timing metadata and alert type metadata and the processor is further configured to access stored information to determine the characteristics of the distribution area, wherein the stored information comprises at least geographical information.

14. The system of claim 13, wherein location metadata includes an emergency location and the content of the modified alert is based on at least one of a distance and direction from the emergency location determined from the geographical information of the distribution area.

15. An edge computing system comprising:
at least one processor programmed to:
receive alerts from United States Emergency Integrated Public Alert and Warning System (IPAWS) including content and location metadata generated by one or more alerting authorities comprising one or more of a national authority, local authority, state authority, territorial authority, and tribal authority;
process, at a central alert orchestrator of a wireless carrier, the received alerts from IPAWS in order to transmit to a regional alert system of the edge computing system, the processing including evaluating the alert based on characteristics of a distribution area;
compare geographical information related to the distribution area to the location metadata of the received alert to generate modified alerts with specific geographical content pertinent to the distribution area;
modify, at the regional alert system, the content of the received alerts based on a location of at least one wireless device within the distribution area of the regional alert system to generate the modified alerts with local content;
determine, at the central alert orchestrator, a list of cells within the distribution area of the regional alert system of the wireless carrier; and
distribute the modified alerts to the at least one wireless device within the list of cells within the distribution area of the regional alert system of the wireless carrier.

16. The system of claim 15, wherein the content includes a URL and modifying the content includes deep packet inspection to intercept the URL and filter URL content.

17. The system of claim 15, wherein the processing of the received alerts comprises processing the alert at a regional alert system at an edge location and requesting that a content delivery network (CDN) at the edge location pre-stage content for retrieval during alert distribution.

\* \* \* \* \*